United States Patent [19]
Bonta et al.

[11] Patent Number: 6,097,953
[45] Date of Patent: Aug. 1, 2000

[54] METHOD OF PERFORMING HANDOFF IN A WIRELESS COMMUNICATION SYSTEM

[75] Inventors: Jeffrey D. Bonta, Arlington Heights; Gary Pregont, Dundee, both of Ill.

[73] Assignee: Motorola, Inc., Schaumburg, Ill.

[21] Appl. No.: 09/219,334

[22] Filed: Dec. 22, 1998

[51] Int. Cl.[7] .................................................. H04Q 7/20
[52] U.S. Cl. .................... 455/436; 455/437; 455/67.1; 455/446
[58] Field of Search ..................... 455/436, 437, 455/438, 439, 440, 441, 442, 443, 444, 446, 456, 525, 67.1, 62, 63; 370/331, 332; 706/20, 25, 31

[56] References Cited

U.S. PATENT DOCUMENTS

| | | | |
|---|---|---|---|
| 5,434,950 | 7/1995 | Kaallman | 706/20 |
| 5,907,807 | 1/1999 | Chavez, Jr. et al. | 455/436 |

*Primary Examiner*—Reinhard J. Eisenzopf
*Assistant Examiner*—Lester G. Kincaid
*Attorney, Agent, or Firm*—John B. MacIntyre; Mario J. Donato, Jr.

[57] ABSTRACT

The present invention provides a method for determining whether to handoff in a wireless communication system (100). The system (100) collects first environmental variables related to a first mobile station (105) within the wireless communication system (100). The system (100) determines when a communication between a base station (101) and the first mobile station (105) is improperly terminated. The system (100) analyzes, when the communication is improperly terminated, the first environmental variables to generate environmental conditions rules. The system (100) then applies the environmental conditions rules to a second mobile station (106) which subsequently communicates with the base station (101) and which has second environment variables substantially similar to the first environmental variables.

22 Claims, 5 Drawing Sheets

METHOD OF PERFORMING HANDOFF IN A WIRELESS COMMUNICATION SYSTEM

FIELD OF THE INVENTION

The invention relates generally to communication systems and more particularly, to handoff in such communication systems.

BACKGROUND OF THE INVENTION

Today, wireless communication systems, such as cellular communication systems, continue new deployment and expansion at a rapid pace. The complexity of the design of these systems contributes to high costs in deployment and optimization. Some of the largest costs are in the time for skilled personnel to fine tune these systems for adequate system performance, since systems cannot be deployed with default parameter settings to control handoff algorithms. This is because local conditions between cells in any system dictates custom parameter settings to avoid poor quality that may lead to dropped calls. Calls are often dropped because the system cannot react quickly enough to handle the local conditions.

Two very common drop call scenarios are related to a poor radio environment which makes it very difficult or impossible to deliver a handoff command to a mobile station to move it away from the poor conditions. In the first scenario, a mobile station may move into the poor environment. By the time the system reacts to handoff the mobile station to the next cell, its too late. The mobile station is incapable of hearing the command, and its connection drops. In the second scenario, the communication system makes a bad decision to handoff the mobile station into a poor radio environment. The mobile station is incapable of recovering the call by commanding it to hand over to a new cell.

Because of the complexity of optimizing systems at a rate to keep up with current growth, it is imperative that a method be provided for the system to self-optimize itself so that the system can be deployed simply with default parameters. Thus, a need exists for an apparatus and method which provides these advantages.

DETAILED DESCRIPTION OF A PREFERRED EMBODIMENT

The present invention provides a method for determining whether to proceed with handoff in a wireless communication system. The wireless communication system includes a base station in communication with a first mobile station. The method includes the steps of collecting first environmental variables related to the first mobile station within the wireless communication system. Such environmental variables can include a quality metric, a Radio Signal Strength Indicator (RSSI) measurement, a location of the mobile station, or other metrics associated with the communication. Environmental variables can also include metrics such as Frame Erasure Rate (FER), total output power at a neighboring cell, and reverse link rise.

It is then determined when a communication between the base station and the first mobile station is improperly terminated. When the communication is improperly terminated, the first environmental variables are analyzed to generate environmental conditions rules. The environmental conditions rules are applied to a second mobile station which subsequently communicates with the base station and which has second environment variables substantially similar to the first environmental variables. It should be understood that the environmental conditions rule could also be applied to the first mobile station when the first mobile station, at a later time during a subsequent communication, has environmental variables substantially similar to the first environmental variables.

Figure 1:
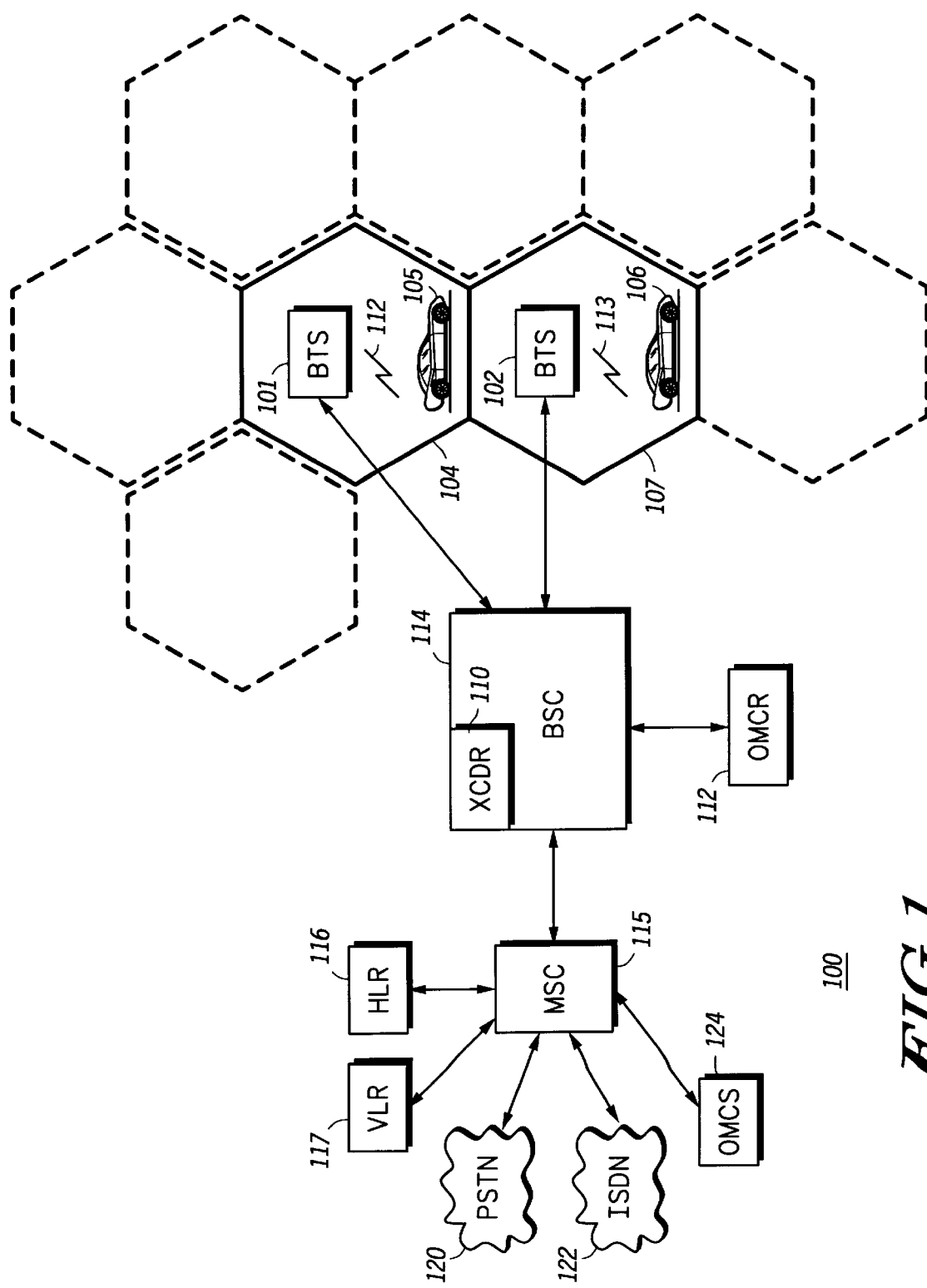
FIG. 1 depicts a communication system in accordance with the preferred embodiment of the present invention.

The present invention can be better understood with reference to FIGS. 1–5. Referring now to FIG. 1, a Global System for Mobile communications (GSM) communication system 100 in accordance with the preferred embodiment of the present invention is depicted. Communication system 100 is preferably a GSM system, but could alternately be PDC, Advanced Mobile Phone Service (AMPS), United States Time Division Multiple Access (US-TDMA), Code Division Multiple Access (CDMA), or any other suitable communication system. Referring to FIG. 1, acronyms are used for convenience. The following is a list of the acronyms used in FIG. 1:

BTS Base Transceiver Station
BSC Base Station Controller
GSM Global System for Mobile communications
HLR Home Location Register
ISDN Integrated Services Digital Network
MS Mobile Station
MSC Mobile Switching Center
OMCR Operations and Maintenance Center—Radio
OMCS Operations and Maintenance Center—Switch
PSTN Public Switched Telephone Network
VLR Visitor Location Register
XCDR Transcoder A first base transceiver station 101 is located in a first coverage area 104 and communicates with a mobile station 105. Mobile station 105 can be a mobile unit, a remote unit, a fixed wireless terminal, or any other unit capable of sending or receiving RF communications to or from first BTS 101. Communication is via a first digital radio channel 112 that contains data information compatible with a GSM communication system. Mobile station 106 communicates with second BTS 102 that is located in second coverage area 107. Communication is via a second digital radio channel 113 that contains data information compatible with a GSM communication system. Base transceiver stations 101 and 102 can include multiple channels.

Also included in FIG. 1 is base transceiver station 102 located within coverage area 107. BTSs 101 and 102 include memory to save and archive drop call records and environmental conditions rule. BTSs 101 and 102 are each coupled to a base station controller (BSC) 114 which includes an XCDR 110. As shown in FIG. 1, the dotted lines within BSC 114 represent control information paths while the solid lines within BSC 114 represent speech information paths. As is clear from FIG. 1, XCDR 110 routes the speech information to and from the base transceiver stations 101 and 102. The speech information is routed to an MSC 115 which provides switching functions for access to PSTN 120 or ISDN 122. HLR 116 and VLR 117 provide location and billing services for the entire system as is well known in the art, while OMCS 124 and OMCR 112 provide diagnostics and maintenance services for the entire system, as is also well known in the art.

Mobile stations 105 and 106 each preferably include a receiver, a transmitter, a processor, and memory. The receiver receives information from BTSs 101 and 102, respectively, via first channel 112 and second channel 113, respectively. The transmitters transmit information to first base station 101 and second base station 102, respectively. The processors update variables pertaining to mobile stations 105 and 106 based at least in part upon the information received from BTSs 101 and 102. The memory stores information related to mobile stations 105 and 106.

The present invention provides a method means for collecting RF measurement data from active calls and analyzing this data to determine a correlation that uniquely defines attributes which contribute to drop call scenarios. This is referred to as pattern recognition. The present invention also provides a method for computing parameter settings that will be used by new specialized algorithms as rules designed to avoid drop call patterns; and a method for real-time pattern matching by these new algorithms to avoid a future drop call scenario via a specialized action defined by the rules. The action of avoiding a drop call pattern may be either avoiding a historically bad handoff decision, or proactively recommending an emergency handoff when the current conditions have historically lead to the inability to handoff when the current trend of conditions continues.

From a high level, this invention collects measurement data from a mobile station and/or a base station for each active call. If the call fails, this measurement data is saved as a record of contributing factors leading to the drop call. The data is compared with other drop call records to find a correlation or pattern that can be monitored by future call processing. If a pattern is found, triggers are set and rules are parameterized so that the monitoring algorithms are made aware that a specialized action is required. The specialized action is essentially the execution of a rule when the measurements fit within specific constraints. Again as an example, the rule can either avoid a bad handoff, or invoke a preemptive handoff to save the call from a historical communication failure that leads to a dropped call. With rules and triggers in place, normal call processing monitors each call to determine if the current signal measurements match conditions or patterns that were observed to have lead to a dropped call. If a match is found, a rule is executed to avoid the drop call scenario.

Figure 2:
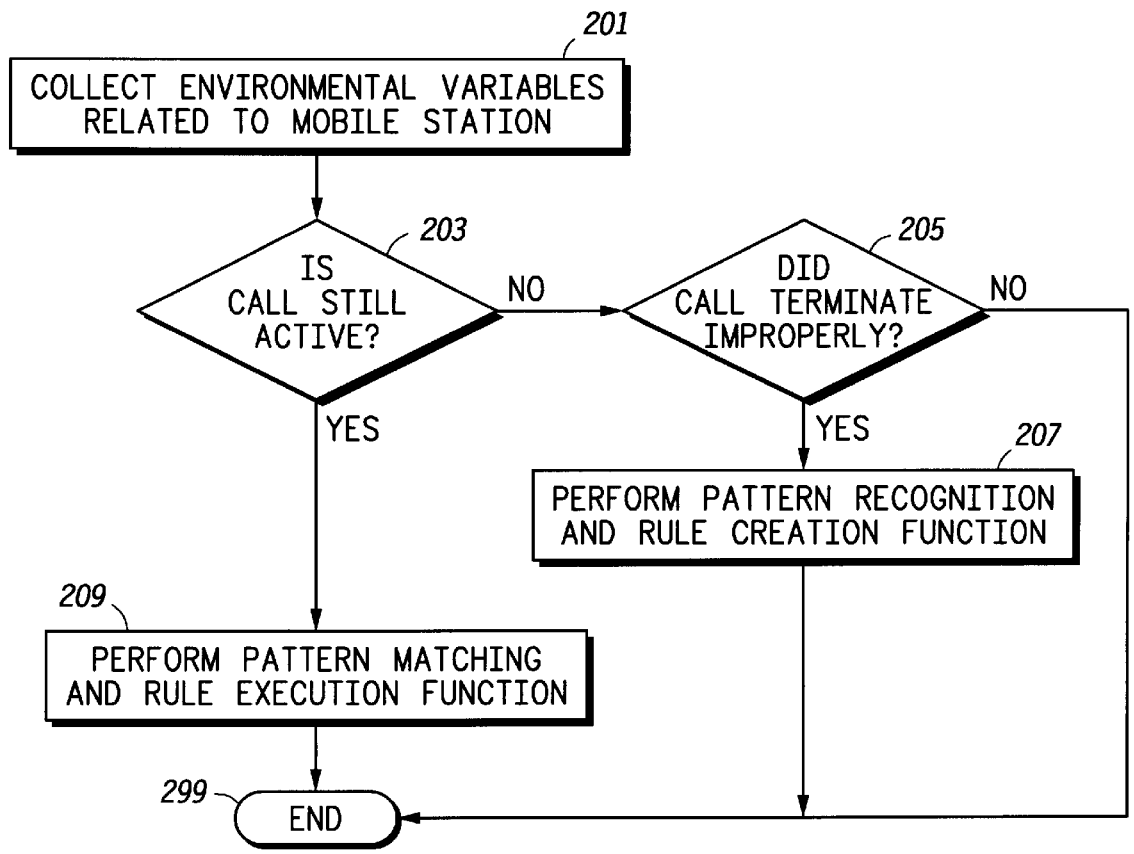
FIG. 2 depicts a flow diagram for improving performance in a communication system in accordance with the preferred embodiment of the present invention.

FIG. 2 depicts a flow diagram 200 for improving performance in a communication system in accordance with the preferred embodiment of the present invention. The system collects (201) environmental variables related to a first mobile station. These variables can include a quality metric, Radio Signal Strength Indication (RSSI) signal for the serving base station, the RSSI of neighboring cells, or the location of the mobile station. The system then determines (203) if the call is still active. If the call is not still active, the system determines (205) if the call terminated improperly.

An improperly terminated call is defined as a call that disconnects without human intervention, such as when the system decides to end the call due to the inability to maintain communication between the mobile station and the base station. If the call did not terminate improperly, then the process ends (299). If the call did terminate improperly, the system performs (207) a pattern recognition and rule creation function, as depicted in FIG. 3.

Figure 3:
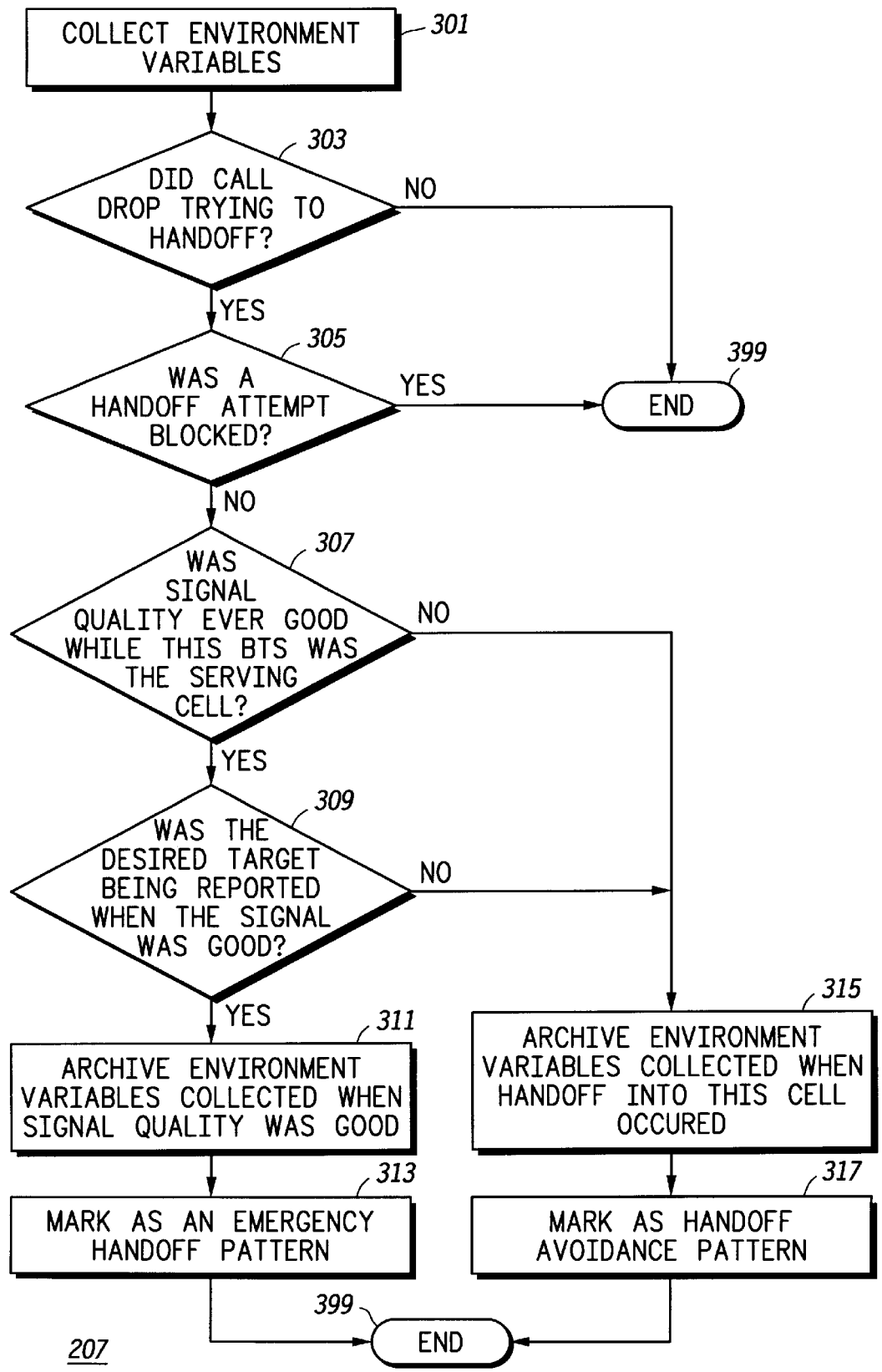
FIG. 3 depicts a flow diagram for performing pattern recognition and rule creation in accordance with the preferred embodiment of the present invention.
Figure 4:
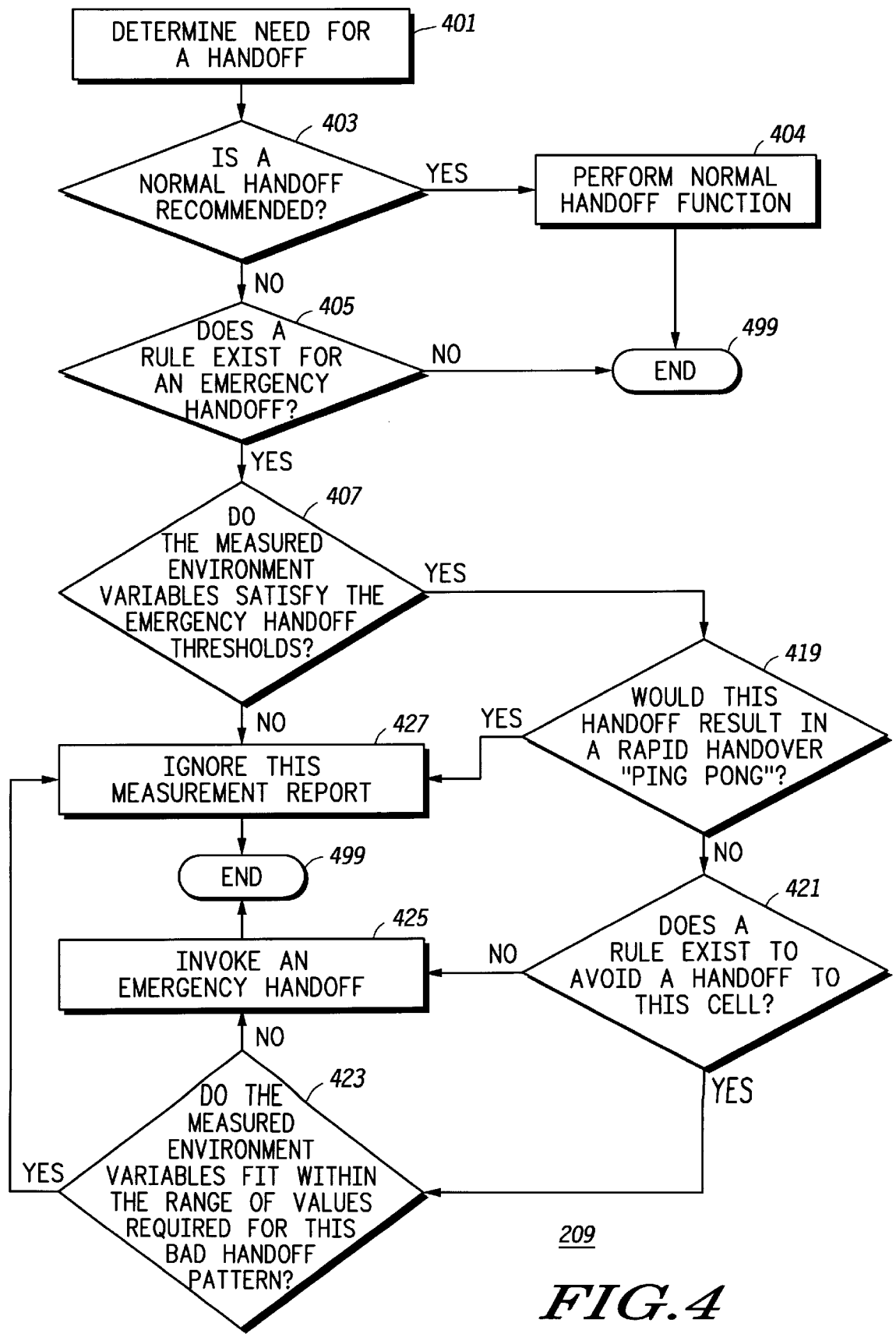
FIG. 4 depicts a flow diagram for performing pattern matching and rule execution when a normal handoff is not recommended in accordance with the preferred embodiment of the present invention.
Figure 5:
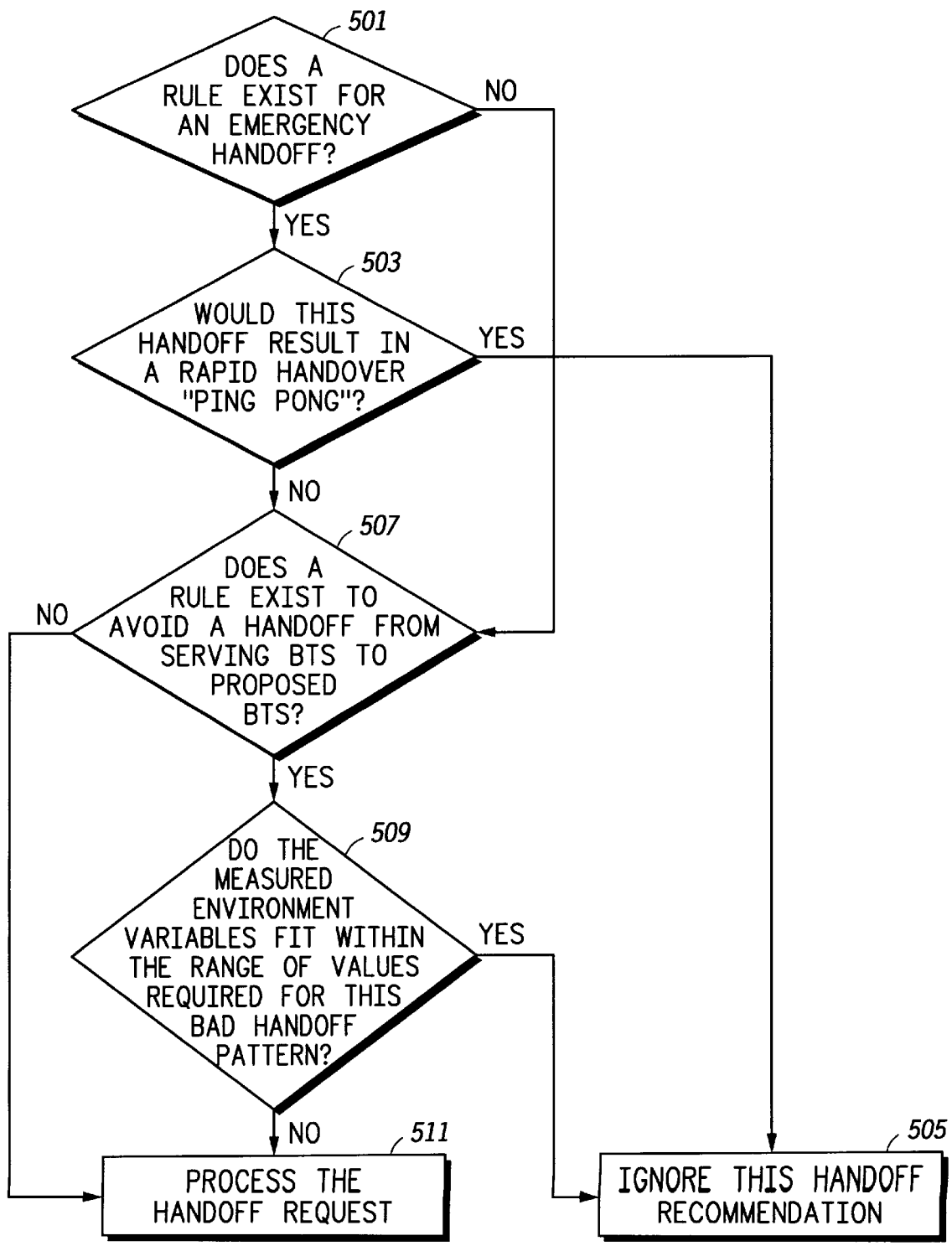
FIG. 5 depicts a flow diagram for performing pattern matching and rule execution when a normal handoff is recommended in accordance with the preferred embodiment of the present invention.

If the call is still active as determined at decision box 203, the system performs (209) a pattern matching and rule execution function, as described in FIGS. 4 and 5. This pattern matching and rule execution function utilizes the pattern recognition and rule creation that occurs as described in FIG. 3 below.

FIG. 3 depicts a flow diagram 207 for performing pattern recognition and rule creation in accordance with the preferred embodiment of the present invention. The process starts by collecting (301) environment variables. In the preferred embodiment, the system collects environment variables under two conditions. First, the system captures data prior to handoff. Second, the system captures data prior to signal degradation (i.e. in the window of time prior to the connection falling below a signal quality threshold such as bit error rate BER). For each of the two conditions, the two most recent samples of measurements data are saved. If a new handoff occurs, the new measurement data overwrites the oldest measurement data. Similarly, if a measurement is captured on a connection above the signal quality threshold, then the oldest measurement is discarded. This is done for a few reasons. One reason is to save storage memory. In an alternate embodiment, more samples could be saved and used to better analyze the trend of the conditions leading up to poor signal quality or bad handoff decisions. The second reason is to allow analysis of bad handoff decisions for the determination of the target cell that would be most suitable to save the call. The third reason is to have a record of favorable conditions far enough in advance of the signal degradation to permit enough time for the monitoring handoff algorithms to force an emergency preemptive handoff to occur based on a pattern match of those saved conditions.

In the preferred embodiment, a GSM system implementation, the measurement data saved was downlink serving cell Rxlev, reported neighbor cell ID's and their corresponding downlink Rxlev, serving cell ID, desired target cell ID, and a rank of the desired target cell. Downlink Rxqual, similar to Bit Error Rate (BER) is used to threshold signal quality. The downlink Rxlev measurements should be normalized to full power to account for downlink power control.

The system then determines (303) if a call dropped trying to handoff. If a call did not drop trying to handoff, then there is no information on which cell the mobile station needed to handoff to in order to maintain the call. Consequently, the process ends (399). In the event that a call drops in this system, the cause of the drop is analyzed. The cause of the drop is determined to be slow reaction time if the current serving cell was the serving cell when Rxqual was last acceptable, the desired target was being reported in measurement reports from the mobile station prior to Rxqual going bad, and no other handoff occurred since Rxqual was last acceptable. In this case, it is determined that an emergency handoff could possibly save a call under similar conditions in the future. The cause of the drop is determined to be a bad handoff decision if Rxqual has been unacceptable for the duration that this cell was the serving cell and the current serving cell was a target candidate when Rxqual was good.

Alternately, the cause is determined to be a bad handoff decision when the current serving cell was the serving cell when Rxqual was last acceptable and the desired target was not being reported by the mobile station prior to Rxqual going bad. This can occur when the mobile station is handed off to a cell that it is incapable of handing off from. Based on the cause of the drop, the measurement data is archived with other measurement data of calls with a similar cause of drop. The data records are arranged in storage based on the source and target cell transition that failed and the rank of the target cell, such as a best neighbor, a second best neighbor, etc.

If it is determined at step 303 that a call dropped trying to handoff, then the system knows the desired target cell that the mobile station needs to handoff to in order to maintain the call. Next, the system determines (305) if the handoff attempt was blocked. If the handoff attempt was blocked, this scenario should not be used to determine a faulty handoff, since the handoff was prevented for reasons other than environmental variables. Consequently, the process ends (399) if the handoff attempt was blocked. If the handoff attempt was not blocked, the system determines (307) if the signal quality has been while this BTS was serving the call. If the signal quality was not good, the system archives (315) the environment variables collected when handoff into this cell occurred. In an alternate embodiment of the present invention, the system determines a degradation point that indicates when a quality indicator drops below a first threshold. This can occur before the call actually drops, and can be an indication of potential future problems. The system then stores the first environmental variables that are collected prior to the degradation point. If the signal quality was good, the system determines (309) if the desired target was being reported by the mobile station when the signal was good. If the desired target was not being reported, the system archives (315) the environment variables collected when the handoff into this cell occurred.

If the desired target was being reported, the system archives (311) the environment variables collected when the signal quality was good. The system then marks (313) these variables as a pattern to be utilized later to perform an emergency handoff when that mobile station exhibits environmental variables similar to those of this cell. In an alternate embodiment of the present invention, the system determines a degradation point that indicates when a quality indicator drops below a first threshold. This can occur before the emergency handoff actually occurs, and can be an indication of potential future problems.

After archiving the environment variables at step 315, the system marks (317) this pattern as a handoff avoidance pattern. In this manner, future mobile stations who exhibit environment variables similar to those of this call will receive an indication that they should avoid handoff to this cell.

Once enough records have been archived to recognize a pattern for a given failed cell to cell transition, the measurement data variables are grouped into ranges that are statistically separate so that outlier records can be determined. For example, the mean, standard deviation (s), and skew of the each of the desired target cell Rxlev values is computed.

As an example of operation of the preferred embodiment of the present invention, input Rxlev values are 40, 50, 52, 41, 46, 51, 42, 54, 43, and 53. Initially, each of the records are grouped into the first range. If the s of the Rxlev values is greater than 3 dB, then all records containing the target Rxlev values less than the mean are assigned to the next higher range. In this example, the s was 4.8 and the mean was 47.2. Therefore, values 40–46 are placed in the next higher range. The mean, s, and skew of the Rxlev values for the remaining records in the current range are again computed and the aforementioned s testing and range splitting is performed repeatedly until the s is less than 3 dB. Once the s is less than 3 dB, then these records make up a statistically separate range, and the process is repeated on the records that were moved to the next higher range. In this example, 2 ranges are created: 40–46 and 50–54. The grouping of the records into ranges is first attempted on the target cell Rxlev values. If the target Rxlev values all fit within the 3 dB s, then the serving cell Rxlev values are examined and split into ranges, if necessary. No attempt to split the serving cell Rxlev values into ranges will occur if the target cell Rxlev values are split into more than one range. Once the records have been split into appropriate ranges, the minimum and maximum bounds of each range is set based on the mean +/- one standard deviation.

Since the ranges are fairly narrow, one s is sometimes too restrictive for the min/max bounds. Therefore, an extra 1 dB is preferably added to one end or both ends of the min/max bounds, depending on the skew of the data. If the skew is less than 0.5 and greater than –0.5, then the min is preferably decreased by 1 dB, and the max is preferably increased by 1 dB. If the skew is less –0.5, then the min is preferably decreased by 1 dB. If the skew is greater than +0.5, then 1 dB is added to the max. Finally, any records assigned to the current range with values outside of the min/max bounds are considered outliers, and are removed from consideration. In the example, one range is bounded by a min of 49 and a max of 54, while the second range is bounded by a min of 39 and a max of 45. Note that the value 46 becomes an outlier. When an outlier if found, the min/max bounds are reevaluated. Thus, the second range bounds change to a min of 39 and a max of 43. If a range does not have enough records to constitute a pattern, then all records in that range are excluded from consideration. In the preferred embodiment, the system decides that a pattern exists when three or more similar records of environment variables are collected.

Once the records are placed into ranges and min/max bounds are assigned to the ranges, an algorithm to resolve conflicts is performed. A conflict occurs when a min/max range from one drop call cause overlaps a range from a different drop call cause such that the system does not know whether to avoid a bad handoff, or to perform a preemptive emergency handoff. For example, if drop calls have been occurring between cell X and cell Y and the system has determined that staying on cell X results in a failed attempt to handoff to cell Y and is followed by a drop, whereas handing over to cell Y from cell X also results in a drop call (under the same source cell and target cell Rxlev conditions), then a conflict exists. To resolve this conflict, two methods have been implemented.

In the preferred embodiment, the remaining reported neighbors at the time of the last handoff and at the time of the last acceptable Rxqual are examined. The most prevalent neighbor is selected for each of the drop call causes. The most prevalent neighbor is the alternate neighbor, not the current target. If the most prevalent neighbor is present in at least 66% of the records for the current Rxlev range, then the minimum and maximum Rxlev bounds of the alternate neighbor cell are computed in a similar fashion as were the min/max for the serving cell and target cell Rxlev values. This alternate neighbor and the computed min/max Rxlev bounds become a range qualifier to be used to resolve the conflict between drop call causes. If the two sets of records from each of the drop call causes both have range qualifiers with the same alternate neighbor cell and the alternate neighbor cell Rxlev ranges also overlap, then a conflict still exists.

In the alternate embodiment of the present invention, the probability of success is used to determine which drop call avoidance method will be used. If 80% of the drops are due to a bad handoff decision, then the method to avoid the drop call will be to avoid handoff. If 80% of the drop call causes for this cell to cell transition are due to waiting too long to handoff, then a preemptive emergency handoff will be used to avoid a drop call. If neither drop call cause is 80% of the cases, then no effort will be made to avoid a drop call until more data is collected.

Following conflict resolution, the final step for pattern recognition/rule creation is the enabling of triggers and thresholds for the pattern matching handoff algorithms. If the drop call cause was a bad handoff decision, then a trigger to avoid a bad handoff for this cell to cell transition is activated provided that there are no conflicts and provided that enough records remain following the algorithm to remove outliers. In this case, the rule to avoid a bad handoff comprises the activated trigger, the minimum and maximum bounds for serving cell and target cell Rxlev, and the range qualifier, if present. If the drop call cause was due to slow reaction to handoff, then three thresholds will preferably be computed.

First, a valid handoff margin range is computed from the difference between the target cell Rxlev values and the serving cell Rxlev values. Next, a handoff threshold is set based on the maximum serving cell Rxlev bound permitted for the serving cell, as computed previously in the outlier algorithm. Then a minimum target cell Rxlev value required for handoff is computed based on the minimum target Rxlev bound computed earlier in the outlier algorithm. With the handoff threshold, the minimum target cell Rxlev required for handoff, the handoff margin, and the range qualifier, if present, a rule is preferably activated to perform an emergency handoff when these thresholds are satisfied for this cell-to-cell transition. Alternately, handoff avoidance can be accomplished by not performing a handoff if the rule indicates that a handoff attempt would be unsuccessful.

This entire pattern recognition process preferably repeats every time a dropped call occurs. All dropped call records are maintained so that the rules are created with sufficient historical information. This ensures that the rules are continually up-to-date with the changes that occur in the system, as well as positive or negative impacts of new rules. An alternate embodiment maintains a set number of drop call records such that the oldest records are replaced with newer records.

In an alternate embodiment of the present invention, mobile location can be utilized for making emergency handoffs or for avoiding bad handoffs. This alternate embodiment would add significant strength to the handoff pattern rules. Location information could be used as a primary pattern variable along with the serving cell and target cell Rxlev if location is readily available, or it could be used as a range qualifier if obtaining location can only be obtained on-demand or infrequently.

FIG. 4 depicts a flow diagram for performing pattern matching and rule execution when a normal handoff is not recommended in accordance with the preferred embodiment of the present invention. This method as depicted in FIGS. 4 and 5 requires real time decisions that are not a burden on the system execution performance. This is accomplished by limiting pattern matching to a series of tests to see if the current radio conditions match the conditions defined in the pattern recognition portion of this invention. The pattern matching algorithm of the present invention performs unique threshold testing to trigger or not trigger the execution of a rule that may or may not result in a handoff invocation.

Specifically, the preferred pattern recognition algorithm computes minimum and maximum bounds of values that the current measured values must fall within. There may be multiple bounds for a given cell-to-cell transition depending on the number of ranges of Rxlev values that were identified for this transition. For GSM systems, the measured values being evaluated are the serving cell downlink Rxlev and one of the neighbor cell downlink Rxlev values currently being reported. The pattern matching tests are performed following the task of collecting measurement reports from the mobile station.

These measurement reports are processed by traditional handoff algorithms to determine (401) if a handoff is required. The system then determines (403) if a traditional handoff is required. If a traditional handoff is required, the system performs (404) a normal handoff function, as depicted in FIG. 5 below.

FIG. 5 depicts a flow diagram for performing pattern matching and rule execution when a normal handoff is recommended in accordance with the preferred embodiment of the present invention. The system determines (501) if a rule exists for an emergency handoff between the current serving cell and the proposed target cell. If a rule does exist, then the serving cell Rxlev and the proposed target cell Rxlev values are tested to see if they fall within the allowed bounds set by the emergency handoff pattern rule. If they fall within bounds for this traditional handoff processing case, then it is necessary to determine if the previous serving cell was the same as the proposed target. Because these emergency handoff algorithms are forcing handoffs to occur earlier than what the traditional algorithms would recommend, it is necessary to avoid rapid handoffs back and forth between two cells.

Therefore, a test for the time of the last handoff from the proposed target is made to determine (503) if handing off to the proposed target will constitute a "ping pong" handoff effect. In the preferred embodiment, a hand-back within 10 seconds is considered a "ping pong" handoff. In an alternate embodiment, a "ping pong" could be based on distance traveled or mobile speed, rather than on time. Distance and speed can be computed based on a variety of location techniques. Speed could also be computed based on a Doppler measurement.

If a "ping pong" will not occur, or if no rule exists for an emergency handoff as determined at step 409, the system determines (507) if a rule exits to avoid a handoff from this serving cell to the proposed target cell. If a rule exists, then the serving cell Rxlev and proposed target cell Rxlev values are tested to determine (509) if the measured environment variables fit within the allowed bounds set by the bad handoff pattern rule. If they fall within the bounds for this traditional handoff processing case, then a test is made to see if a bad handoff pattern range qualifier is present. If there is a range qualifier and the alternate cell Rxlev values are not within the permissible range, then the system performs (511) the handoff request. If the measure environment variables do not fit within the range, the system ignores (505) the handoff recommendation. In the preferred embodiment, the handoff to this target will be rejected in favor of a handoff to one of the other currently reported neighbor cells, if acceptable.

Returning now to FIG. 4, if a normal handoff is not recommended at step 403, the system determines (405) if a rule exists for an emergency handoff between the current serving cell and any of the currently reported neighbor cells. If a rule exists, the system determines (407) if the measured environment variables satisfy the emergency handoff thresholds. If the measured environment variables do not satisfy the emergency handoff thresholds, the system ignores (427) this measurement report.

If the measured environment variables do satisfy the emergency handoff thresholds, the system determines (419) if this handoff transition will result in a rapid handoff "ping-pong", as described above.

If the handoff would result in a "ping-pong", the system ignores (427) this measurement report. If the handoff would not result in a "ping-pong" condition, the system determines (421) if a rule exists to avoid a handoff from the serving cell to the proposed target cell. If a rule does not exist, the system invokes (425) an emergency handoff. If a rule does exist to avoid a handoff from the serving cell to the proposed target cell, the system determines (423) if the measured environment variables fit within the range of values required for this bad handoff pattern. If they do, the system ignores (427) the measurement report. If the measured environment variables do not fit within the range of values required for this pattern, the system invokes (425) an emergency handoff.

It should be understood that the RF measurement data collection and the new pattern matching handoff algorithms can be performed in the BTS or BSC. The pattern recognition data analysis and the rule computation may be at some higher point in the network, possibly a centralized location. The actual location of the analysis and computation depends on how much data needs to be transmitted to and from the analysis and computation engine.

The present invention also provides a method for determining the location of a second mobile station. When a second mobile station has environmental conditions rules that are identical to or substantially similar to those archived in the system, the system can determine the location of the second mobile station based upon a comparison of the environmental conditions rules from a first mobile station.

While the algorithms discussed herein describe a method for preventing dropped calls by avoiding bad handoffs and preemptively forcing emergency handoffs, the present invention can also be used to perform normal handoffs. Rather than training the system on bad events, it could be trained on good events.

The preferred embodiment of the present invention relies on measurements taken at a snapshot in time. The method could be adopted to handle a trend of measurements or a slope between an interval of measurements. The pattern recognition and pattern matching could then take advantage of this additional variable to strengthen the confidence of a specialized handoff decision.

In addition, there may be other ways to handle the discrimination of conflict cases mentioned earlier with two schemes. In one alternate embodiment, a probability of success was described for discrimination that was based strictly on the case that had 80% of the total patterns. One alternate method could use a strength attribute associated with each conflicting rule. The strength increases each time the rule is executed without a dropped call and decreases if the rule execution causes a drop call. For example, once a conflict is detected, one of the conflicting rules is given a higher strength and the next pattern match would use the rule with the higher strength. Now, if the call does not drop before it either ends or hands off again, its strength is increased. Otherwise, it decreases. If its strength decreases below the strength of the other conflicting rule, then the other rule becomes the rule that is used. This continues since the rule with the highest strength always is given preference.

The present invention provides a method will allow a system to automatically tune specialized actions or algorithms to avoid call scenarios or patterns that historically lead to a dropped call. The system will respond in real time to the need for a specialized action to avoid a potential dropped call, however, the tuning of the algorithms will occur as data from successful and unsuccessful calls is accumulated and analyzed over a period of time. The specialized action is typically a handoff, but could be an action such as a power adjustment, or even an alarm signaling a system design problem.

While this invention has been described in terms of certain examples thereof, it is not intended that it be limited to the above description, but rather only to the extent set forth in the claims that follow.

We claim:

1. A method for determining whether to handoff a mobile station in a wireless communication system, the wireless communication system including a base station in communication with a first mobile station, the method comprising the steps of:

collecting first environmental variables related to the first mobile station within the wireless communication system;

determining when a communication between the base station and the first mobile station is improperly terminated;

analyzing, when the communication is improperly terminated, the first environmental variables to generate environmental conditions rules; and applying the environmental conditions rules to a second mobile station which subsequently communicates with the base station and which has second environment variables substantially similar to the first environmental variables.

2. A method for determining whether to handoff in accordance with claim 1, wherein handoff of the second mobile station in communication with the base station is performed based upon a prediction of when the second mobile station's communication would be lost.

3. A method for determining whether to handoff in accordance with claim 1, wherein handoff of the second mobile station in communication with the base station is denied even when recommended based upon the environmental conditions rules.

4. A method for determining whether to handoff in accordance with claim 1, wherein the step of collecting first environmental variables comprises the step of determining a quality metric related to the first mobile station and the serving cell within the wireless communication system.

5. A method for determining whether to handoff in accordance with claim 1, wherein the step of collecting first environmental variables comprises the step of determining a Frame Erasure Rate (FER) at the base station.

6. A method for determining whether to handoff in accordance with claim 1, wherein the step of collecting first environmental variables comprises the step of determining a total output power metric at the second base station.

7. A method for determining whether to handoff in accordance with claim 1, wherein the step of collecting first environmental variables comprises the step of determining a reverse link rise at the base station.

8. A method for determining whether to handoff in accordance with claim 1, wherein the step of collecting first environmental variables comprises the step of determining a signal strength metric related to the first mobile station within the wireless communication system.

9. A method for determining whether to handoff in accordance with claim 8, wherein the step of determining a signal strength metric related to the first mobile station comprises the step of determining a serving signal strength metric associated with the base station within the wireless communication system.

10. A method for determining whether to handoff in accordance with claim 8, wherein the step of determining a signal strength metric related to the first mobile station comprises the step of determining a serving signal strength metric associated with the target base station within the wireless communication system.

11. A method for determining whether to handoff in accordance with claim 1, wherein the step of collecting first environmental variables comprises the step of determining a location metric related to the first mobile station within the wireless communication system.

12. A method for determining whether to handoff in accordance with claim 1, the method further comprising the steps of:
   determining a degradation point that indicates when a quality indicator drops below a first threshold; and
   storing the first environmental variables that are collected prior to the degradation point.

13. A method for determining whether to handoff in accordance with claim 1, wherein the environmental conditions rules are used to determine the location of the second mobile station.

14. A method of performing handoff in a wireless communication system, the wireless communication system including a base-station responsive to a first mobile station and a second mobile station, the method comprising the steps of:
   collecting a first set of environmental variables related to the first mobile station in communication with the first base-station;
   handing over the mobile station's communication to a second base-station;
   collecting a second set of environmental variables related to the first mobile station in communication with the second base-station;
   analyzing the second set of environmental variables to generate environmental conditions rules when the communication is improperly terminated; and
   applying the environmental rules to mobile stations which communicate with the first base-station in the future and which have environment variables substantially similar to the first environmental variables.

15. A method of performing handoff in accordance with claim 14, wherein the step of collecting first environmental variables comprises the step of determining a quality metric related to the first mobile station and the serving cell within the wireless communication system.

16. A method of performing handoff in accordance with claim 14, wherein the step of collecting first environmental variables comprises the step of determining a Frame Erasure Rate (FER) at the base station.

17. A method of performing handoff in accordance with claim 14, wherein the step of collecting first environmental variables comprises the step of determining a total output power metric at the second base station.

18. A method of performing handoff in accordance with claim 14, wherein the step of collecting first environmental variables comprises the step of determining a reverse link rise at the base station.

19. A method of performing handoff in accordance with claim 14, wherein the step of collecting first environmental variables comprises the step of determining a signal strength metric related to the first mobile station within the wireless communication system.

20. A method of performing handoff in accordance with claim 19, wherein the step of determining a signal strength metric related to the first mobile station comprises the step of determining a serving signal strength metric associated with the base station within the wireless communication system.

21. A method of performing handoff in accordance with claim 19, wherein the step of determining a signal strength metric related to the first mobile station comprises the step of determining a signal strength metric associated with the target base station within the wireless communication system.

22. A method of performing handoff in accordance with claim 14, wherein the step of collecting first environmental variables comprises the step of determining a location metric related to the first mobile station within the wireless communication system.

* * * * *